US007706843B2

(12) United States Patent
Kaplan

(10) Patent No.: US 7,706,843 B2
(45) Date of Patent: Apr. 27, 2010

(54) MOBILE HANDSET INCLUDING ALERT MECHANISM

(75) Inventor: Diego Kaplan, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 415 days.

(21) Appl. No.: 10/251,637

(22) Filed: Sep. 19, 2002

(65) Prior Publication Data

US 2004/0203490 A1 Oct. 14, 2004

(51) Int. Cl.
*H04M 1/00* (2006.01)
(52) U.S. Cl. ............... 455/567; 455/550.1; 379/373.02; 340/7.58; 340/7.61
(58) Field of Classification Search .......... 455/567, 455/575.1, 90.1, 566, 550.1; 379/373.02; 340/7.58, 7.61
See application file for complete search history.

(56) References Cited

U.S. PATENT DOCUMENTS

| | | | | |
|---|---|---|---|---|
| 6,438,390 B1 * | 8/2002 | Awan | ......................... | 455/566 |
| 6,792,294 B1 * | 9/2004 | Kushita | ...................... | 455/566 |
| 6,944,482 B2 * | 9/2005 | Engstrom et al. | ........... | 455/566 |
| 2003/0083110 A1 * | 5/2003 | Lutche et al. | ............... | 455/567 |
| 2003/0087664 A1 * | 5/2003 | Murray et al. | .............. | 455/553 |
| 2003/0119460 A1 * | 6/2003 | Zipper | ........................ | 455/115 |
| 2003/0166405 A1 * | 9/2003 | Jauk et al. | .................... | 455/466 |
| 2004/0158865 A1 * | 8/2004 | Kubler et al. | ................. | 725/82 |
| 2004/0179655 A1 * | 9/2004 | Brandt | ........................ | 379/52 |

FOREIGN PATENT DOCUMENTS

JP 11103334 A * 4/1999

* cited by examiner

*Primary Examiner*—Nay A Maung
*Assistant Examiner*—Angelica M Perez

(57) ABSTRACT

A mobile handset including a light-alert feature that overcomes some of the problems of cell phone ringers and vibration mechanisms. A mobile handset includes a phone housing, a display carried by the phone housing, one or more illumination devices other than the display carried by the housing that illuminate upon one or more events, and at least one of electronics and software to cause the one or more illumination devices to illuminate upon one or more events.

28 Claims, 6 Drawing Sheets

| Pattern Name | Appearance (Patterns repeat. Read pattern from left to right, then begin from the left again.) | | | | | | | |
|---|---|---|---|---|---|---|---|---|
| Circle | ≡ ≡<br>≡ ≡<br>≡ ≡<br>  = | ≡ ≡<br>≡ ≡<br>  ≡<br>≡ ≡ | ≡ ≡<br>  ≡<br>≡ ≡<br>≡ ≡ | ≡ ≡<br>≡ ≡<br>≡ ≡<br>≡ ≡ | ≡<br>≡ ≡<br>≡ ≡<br>≡ ≡ | ≡ ≡<br>≡<br>≡ ≡<br>≡ ≡ | ≡ ≡<br>≡ ≡<br>≡<br>≡ ≡ | ≡ ≡<br>≡ ≡<br>≡ ≡<br>  ≡ |
| | As each LED lights, it ramps on gradually and fades out gradually giving a "breathing" effect for each LED. | | | | | | | |
| Upwards | ≡ ≡<br>≡ ≡<br>≡ ≡<br>≡ ≡ | | ≡ ≡<br>≡ ≡<br><br>≡ ≡ | | ≡ ≡<br><br>≡ ≡<br>≡ ≡ | | <br>≡ ≡<br>≡ ≡<br>≡ ≡ | |
| | Each LED lights normally (full brightness on, full off). | | | | | | | |
| Downwards | <br>≡ ≡<br>≡ ≡<br>≡ ≡ | | ≡ ≡<br><br>≡ ≡<br>≡ ≡ | | ≡ ≡<br>≡ ≡<br><br>≡ ≡ | | ≡ ≡<br>≡ ≡<br>≡ ≡<br> | |
| | Each LED lights normally. | | | | | | | |
| Opposite | ≡<br>≡ ≡<br>≡ ≡<br>  ≡ | ≡ ≡<br>  ≡<br>≡<br>≡ ≡ | ≡ ≡<br>  ≡<br>≡<br>≡ ≡ | ≡<br>≡ ≡<br>≡ ≡<br>≡ | ≡ ≡<br>≡<br>≡<br>≡ ≡ | ≡ ≡<br>≡<br>≡<br>≡ ≡ | | |
| | As each LED lights, it ramps on gradually and fades out gradually giving a "breathing" effect for each LED. | | | | | | | |
| Up and Fall | ≡ ≡<br>≡ ≡<br>≡ ≡<br> | ≡ ≡<br>≡ ≡<br><br> | ≡ ≡<br><br><br> | | ≡ ≡<br><br><br> | ≡ ≡<br>≡ ≡<br><br> | ≡ ≡<br>≡ ≡<br>≡ ≡<br> | ≡ ≡<br>≡ ≡<br>≡ ≡<br>≡ ≡ |
| | The LEDs rise, they light normally. As they fall, they breathe. Falling happens twice as fast as the rise. | | | | | | | |
| Solid | | | | | | | | |
| | All LEDs light at once for an allotted time. | | | | | | | |

FIG. 5

| | | | | |
|---|---|---|---|---|
| 0x80 | 0x00 | 0x00 | 0 | (Label) |
| 0x00 | 0x70 | 0x07 | 100 | (State 1) |
| 0x03 | 0xc0 | 0x3c | 100 | (State 2) |
| 0x1e | 0x21 | 0xe2 | 100 | (State 3) |
| 0xf1 | 0x0f | 0x10 | 100 | (state 4) |
| 0x88 | 0x08 | 0x80 | 100 | (State 5) |
| 0x40 | 0x04 | 0x00 | 100 | (State 6) |
| 0xc0 | 0x00 | 0x05 | 0 | (LOOP 5 times) |

200

| Situation | Behavior |
|---|---|
| Player dies | Solid pattern, Breathe while going to off state (no repeat) |
| Player shoots | Upwards pattern synced with keypress |
| Dialog informing player wins a round, etc | Circle pattern (repeat until dialog acknowledged or times out) |
| Player life force display | No pattern, rather display a reflection of the level of life force left. High level, all lights lit. lowest level only one bottom light lit on each side. |

FIG. 9

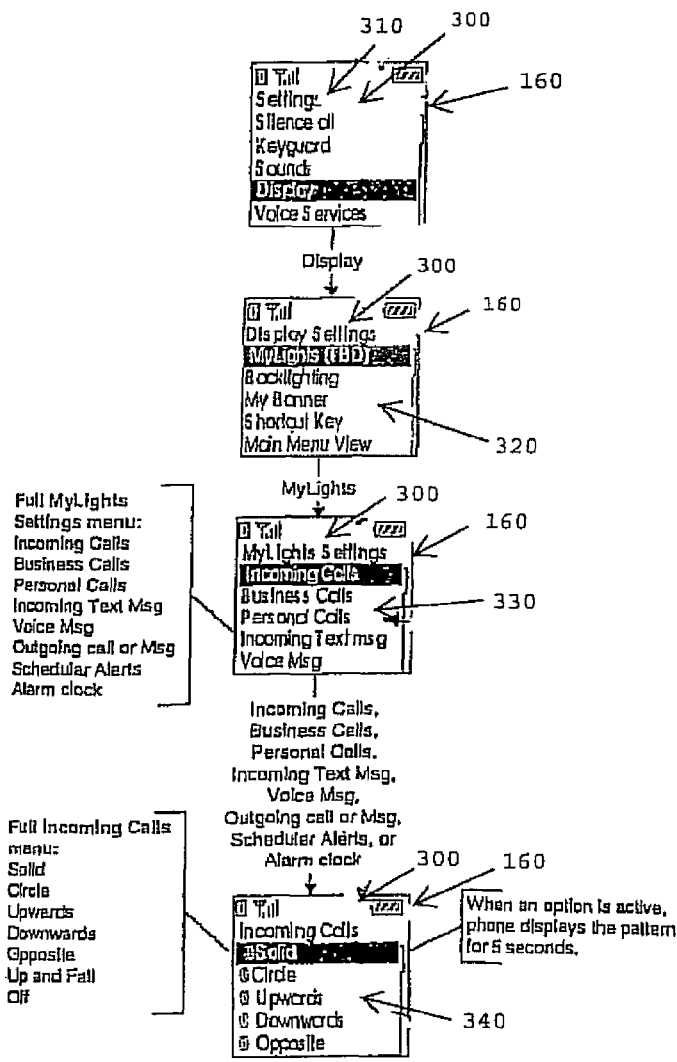

FIG. 10

MOBILE HANDSET INCLUDING ALERT MECHANISM

FIELD OF THE INVENTION

The present invention is, in general, in the field of mobile handsets, and, in particular, in the field of light-alert mechanisms for wireless mobile handsets operating on a public carrier system.

BACKGROUND OF THE INVENTION

In the past, mobile handset users have been alerted of incoming phone calls by a ringer or a vibration mechanism in the mobile handset. A distinct audible ring is emitted from the mobile handset when the ringer detects the one or more signals representative of an incoming phone call. A problem with a ringer is that the audible ring emitted can be distracting to others in the vicinity of the mobile handset and a source of embarrassment for the mobile handset user, especially if the user forgets to turn the ringer off and ringer goes off in quiet locations and situations such as office meetings, libraries, churches, etc. Ringers can also be difficult to hear in loud environments (e.g., bars, concerts). Vibration mechanisms have been added to mobile handsets in an effort to reduce the distraction caused by the ringers of mobile handsets and to alert users when the phone is used in a loud environment. A vibration mechanism alerts the mobile handset user of an incoming call by vibrating, which the user senses. A problem with vibration mechanisms is that in certain situations, such as if the mobile handset is on a hard surface (e.g., table, desk), the vibration mechanism can emit an even more distracting noise than the ringer. Further, if the mobile handset is located across the room from the user or is not located against the user's body, the user may never sense or hear the vibration of an incoming call, causing the user to miss the call.

SUMMARY OF THE INVENTION

An aspect of the invention involves a mobile handset including a light-alert feature that overcomes some of the problems of cell phone ringers and vibration mechanisms. The mobile handset includes a phone housing, a display carried by the phone housing, one or more illumination devices other than the display carried by the housing that illuminate upon one or more events, and at least one of electronics and software to cause the one or more illumination devices to illuminate upon one or more events.

Another aspect of the invention involves a method of alerting a user of a mobile handset of an event on the phone. The method includes providing a mobile handset including a phone housing, a display carried by the phone housing, one or more illumination devices other than the display carried by the housing, and at least one of electronics and software, and causing the one or more illumination devices to illuminate upon one or more events with at least one of the electronics and software to alert a user of the one or more events.

A further aspect of the invention involves a method of alerting a user of a mobile handset of an incoming call on the phone. The method includes providing a mobile handset including a light, a receiver to receive one or more signals representative of an incoming call, and at least one of electronics and software to process the one or more signals representative of the incoming call and cause the light to illuminate upon an incoming call; receiving one or more signals representative of an incoming call with the receiver; processing the one or more signals representative of the incoming call with at least one of electronics and software; and causing the light to illuminate to alert a user of an incoming call.

Further objects and advantages will be apparent to those skilled in the art after a review of the drawings and the detailed description of the preferred embodiments set forth below.

BRIEF DESCRIPTION OF THE DRAWINGS

FIG. 5 is an embodiment of a table including exemplary illumination patterns for the light-alert mechanism.

FIG. 9 is a table illustrating exemplary illumination patterns for the illumination devices of the light-alert mechanism for various situations or events in a video game played on the mobile handset.

FIG. 10 illustrates multiple screen shots of an exemplary light-alert user interface of the mobile handset.

DETAILED DESCRIPTION OF PREFERRED EMBODIMENTS

Figure 1:
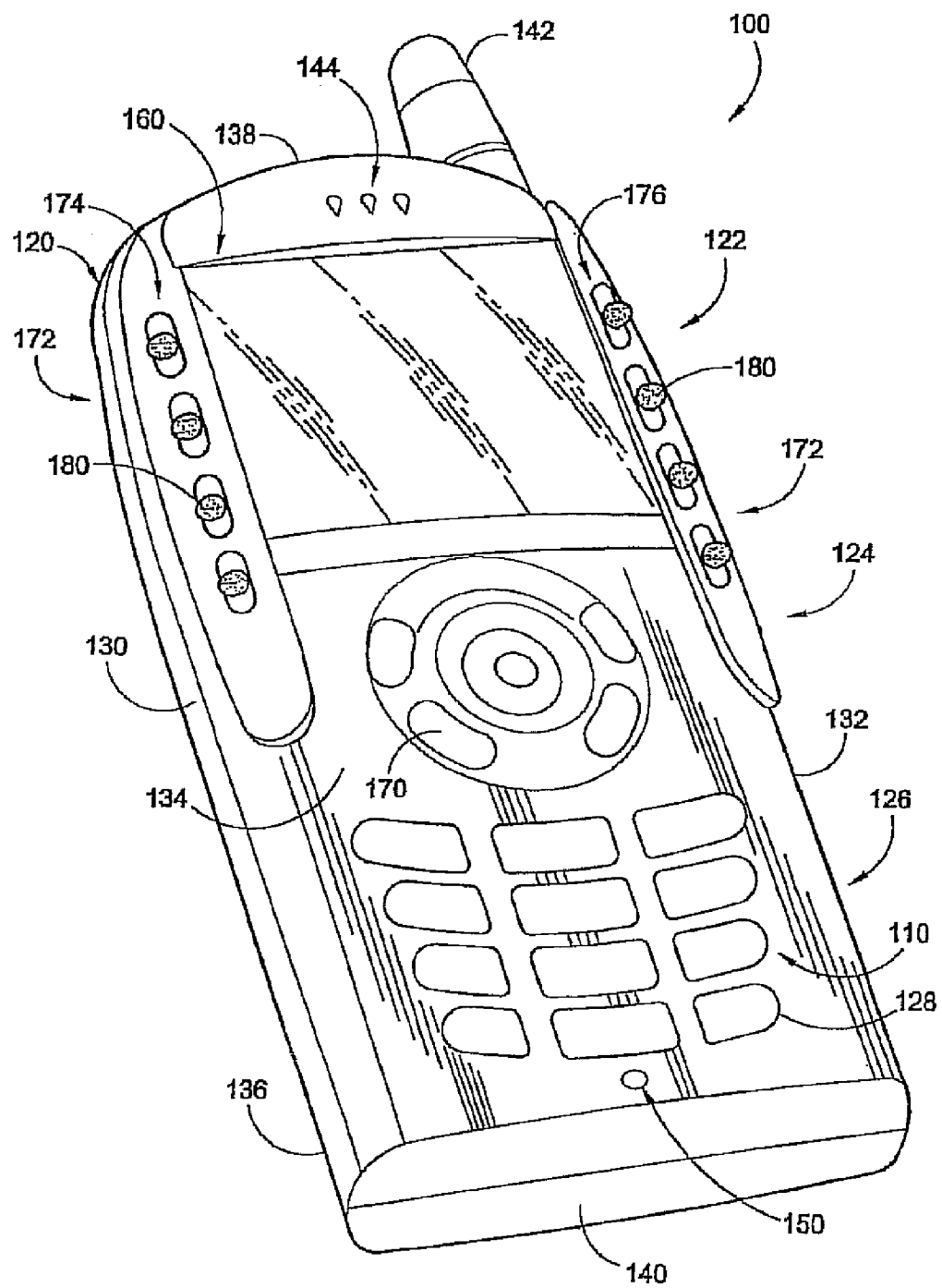
FIG. 1 is a perspective view of an embodiment of a mobile handset including a light-alert mechanism.
Figure 2:
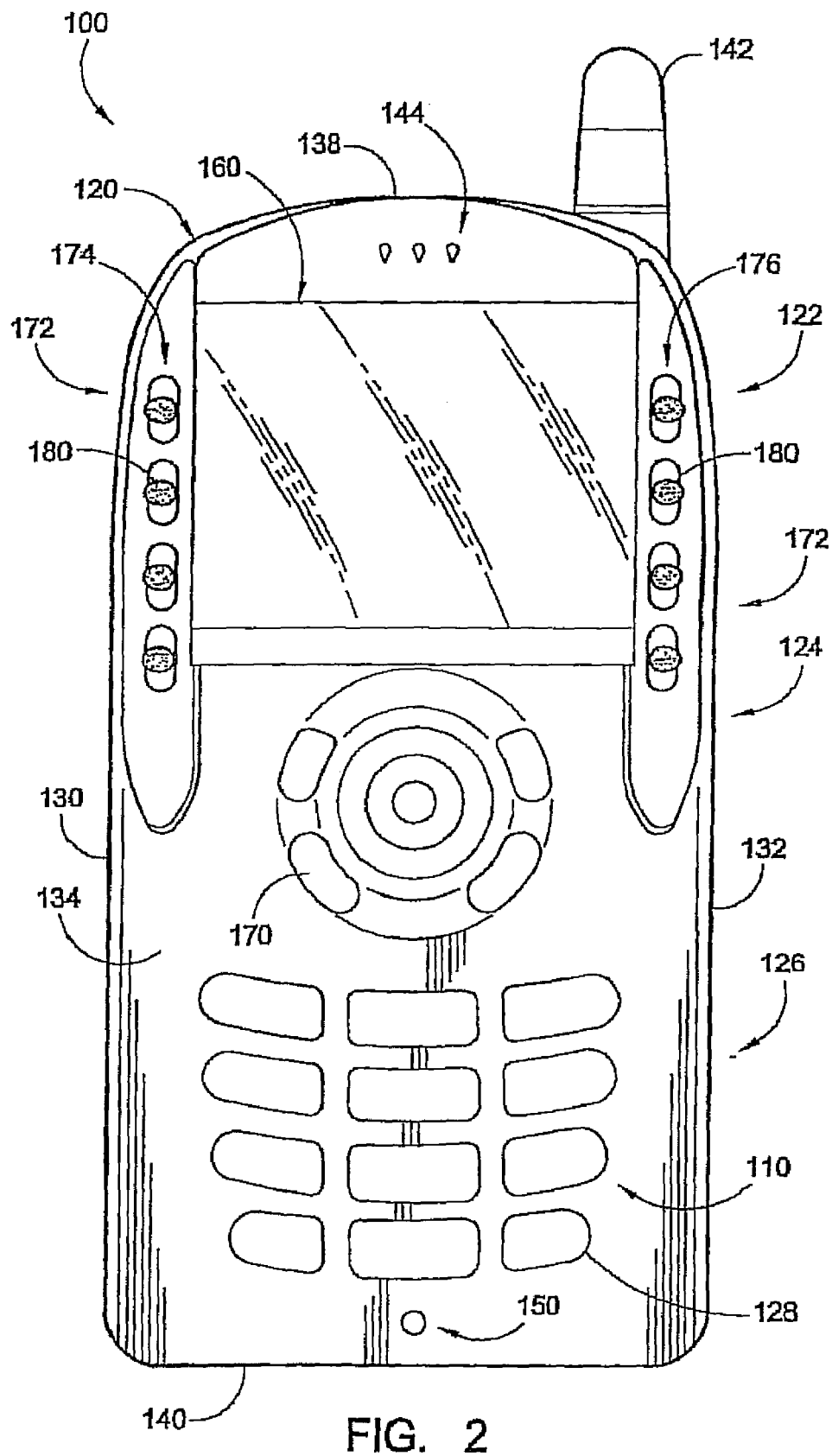
FIG. 2 is a top plan view of the mobile handset illustrated in FIG. 1.
Figure 3:
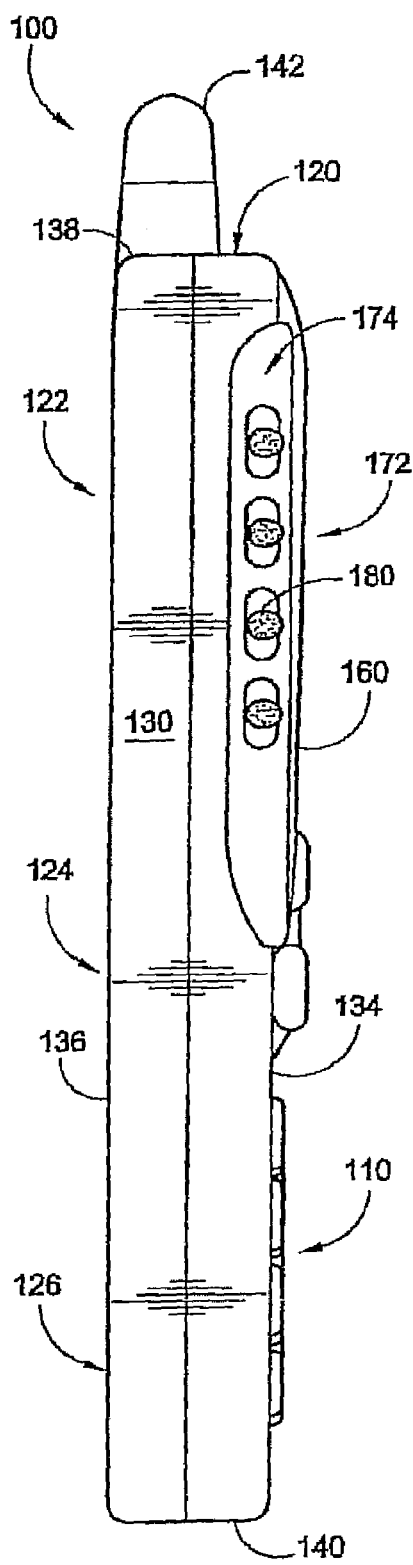
FIG. 3 is a left side-elevational view of the mobile handset illustrated in FIG. 1.
Figure 4:
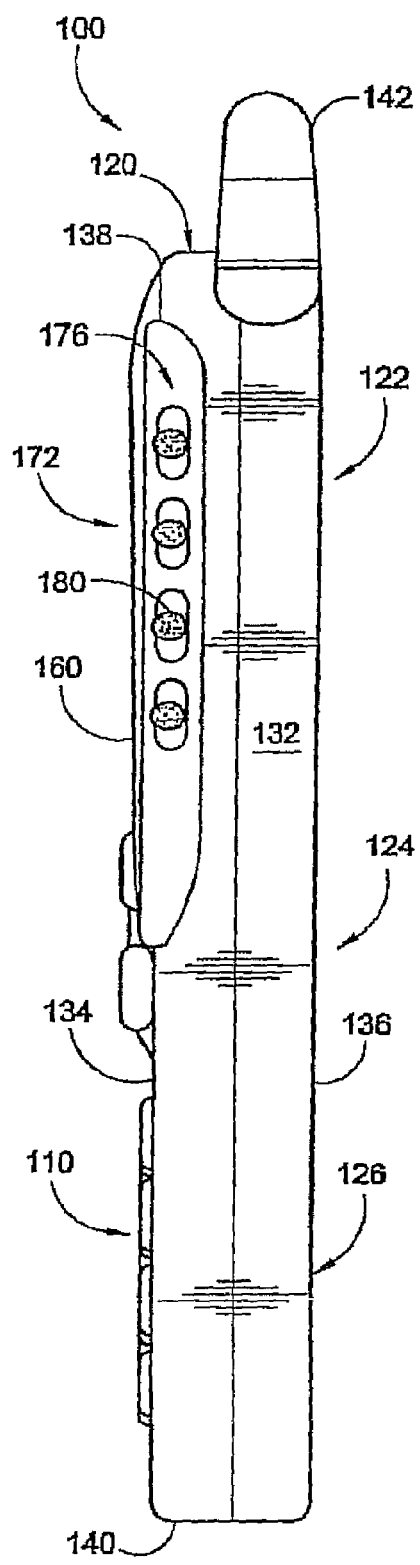
FIG. 4 is a right side-elevational view of the mobile handset illustrated in FIG. 1.

With reference to FIGS. 1-4, an embodiment of a mobile handset 100 including a light-alert feature will now be described. Some general features of the phone 100 will first be described before describing the light-alert feature of the phone 100.

The phone 100 includes a phone keypad 110 carried by a housing 120 with an upper portion 122, an intermediate portion 124, and a lower portion 126. The phone keypad 110 includes a plurality of conventional telephone keys 128 (individual 0-9 number keys, * key, and # key) disposed in and outwardly directed from the housing 120 in the lower portion 126. The housing 120 includes a left lateral side 130, a right lateral side 132, a front face 134, a rear face 136, a top end 138, and a bottom end 140. A retractable antenna 142 extends outwardly from the housing 120. A speaker 144 and a microphone 150 are disposed in and are outwardly directed from the housing 120 in the upper portion 122 and the lower portion 126, respectively. A display 160 is outwardly directed from the housing 120 in the upper portion 122. One or more keys, buttons, or input members 170 located in the intermediate portion 126 may be used to operate the phone 100.

The light-alert feature of the phone 100 will now be described in more detail. Near opposite sides 130, 132 of the housing 120, the phone 100 includes a light-alert mechanism 172 comprising vertical columns or sets 174, 176 of multiple illumination devices 180. The illumination devices 180 are disposed in and are outwardly directed from the housing 120 in the upper portion 122, at the junction of the front face 134 and the opposite sides 130, 132 of the housing 120. In alternative embodiments, the illumination devices 180 may be located on the front face 134, the rear face 136, the top end 138, the bottom end 140, the left side 130, the right side 132, or any combination of these locations.

In a preferred embodiment, the illumination devices 180 are light emitting diodes (LEDs) that have variable intensity levels; however, in alternative embodiments, other types of illumination devices such as, but not by way of limitation, low-power incandescent bulbs, fluorescent bulbs, or variable-color illumination devices may be used. LEDs are especially advantageous for use with the mobile handset 100 because they emit little to no heat, consume little power, and may emit extremely bright and intense light. Because the LEDs emit little to no heat, the LEDs may be illuminated while, for example, the phone 100 is in one's pocket, purse, etc. Because the LEDs consume little power, numerous illumination devices 180 may be used with little effect on the life of the phone power source. Because the LEDs may emit an extremely bright, intense light, they are ideal illumination devices 180 for visual detection of an incoming call or event in all environmental lighting conditions.

All of the illumination devices 180 may be of the same type (e.g., all white LEDs) or one or more of the illumination devices 180 may be of one or more different types. For example, but not by way of limitation, the left vertical column 174 may include all red LEDs and the right vertical column 176 may include all green LEDs. Lenses may cover the illumination devices 180. If it is desired for one or more of illumination devices 180 to illuminate one or more different colors, the lenses may be colored for this purpose. The lenses may be transparent, translucent, or refractive.

Although in the embodiment shown four illumination devices 180 are in each column 174, 176, the columns 174, 176 may include other numbers of illumination devices 180 (e.g., 1, 2, 3, 5, 6, etc.). Further, other numbers of columns may exists (e.g., 1, 3, 4, etc.). Still further, the illumination devices 180 may be organized in one or more horizontal rows or other configurations.

Hardware (e.g., electronics) or software in the phone 100 may cause the illumination devices 180 to illuminate in a pattern or sequence when a receiver of the phone 100 receives one or more signals representative of an incoming call or upon one or more other events.

With reference to FIG. 5, a number of exemplary illumination patterns for the illumination devices 180 will now be described in turn.

In a "Circle" lighting pattern, one illumination device 180 may be lit at a time in a circular pattern as shown. Illumination of each illumination device 180 may fade in and fade out, giving a "breathing" effect to each illumination device 180.

In an "Upwards" lighting pattern, corresponding pairs of illumination devices 180 in the left column 174 and right column 176 may be lit, starting with a bottom pair of illumination devices 180 and progressing up to a top pair of illumination devices 180. In this pattern, when the illumination devices 180 are lit, they may be full intensity on or completely off.

In a "Downwards" lighting pattern, the illumination devices 180 may illuminate in exactly an opposite manner from the "Upwards" lighting pattern. Corresponding pairs of illumination devices 180 in the left column 174 and right column 176 may be lit, starting with a top pair of illumination devices 180 and progressing down to a bottom pair of illumination devices 180.

In an "Opposite" lighting pattern, pairs of illumination devices 180 on opposite sides and ends positions may progressively illuminate. In this pattern, illumination of each illumination device 180 may fade in and fade out.

In an "Up and Fall" illumination pattern, the left column 174 and right column 176 of illumination devices 180 may be gradually lit, with the lighted height of the columns 174, 176 gradually increasing and decreasing. In this pattern, when the lighted height of the columns 174, 176 gradually increases or rises, the illumination devices 180 may be lit turning the illumination devices on only at full intensity. When the lighted height of the columns 174, 176 gradually decreases or falls, the lit illumination devices 180 may fade out. The fall or decrease in the lighted height of the illumination devices 180 may be twice as fast as the rise or increase in the lighted height of the illumination devices 180.

In a "solid" illumination pattern, all of the illumination devices 180 may be illuminated at full intensity for a predetermined period of time.

Although a number of specific illumination patterns have been described for the illumination devices 180, other illumination patterns may be used.

Figures 6, 7, 8:
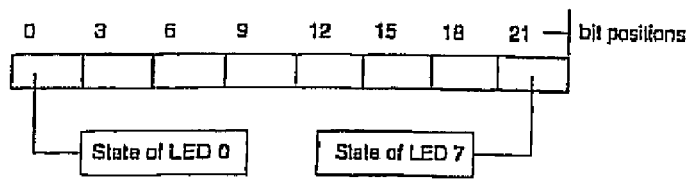
FIG. 6 is an embodiment of a data table having multiple data records representing states and durations of illumination devices of the light-alert mechanism.
FIG. 7 is a row of cells showing the bit positions for the states of eight illumination devices in an individual exemplary data record.
FIG. 8 is an embodiment of a data table that causes the illumination devices in the light-alert mechanism to illuminate upwards and leave a trail of lit illumination devices.

With reference to FIGS. 6-8, a data table 190 for controlling the patterns of the illumination devices 180 may include multiple data records of states and durations. The states may be the intensity levels of the variable-intensity illumination devices 180. There may be eight states or intensity levels ranging from an intensity of 0 (off) to an intensity level of 7 (maximum intensity). In an alternative embodiment, the states may be colors of variable-color illumination devices 180. In such an embodiment, there may also be eight states or colors (e.g., 0 (white), 1 (red), 2 (orange), 3 (yellow), 4 (green), 5 (blue), 6 (indigo), 7 (violet)).

In the embodiment shown, where the phone 100 includes eight illumination devices 180, each record of the data table 190 may use three bytes to indicate the states of the illumination devices 180 and one byte to indicate the duration that the illumination devices 180 are in those states.

FIG. 7 is a row of cells representing the three bytes of a record in the data table 190 that indicate the state of the eight illumination devices 180. Each cell represents three bits for indicating, in binary, the state (of eight possible states (0-7)) of a particular illumination device 180. The bit positions for the eight illumination devices 180 are shown. With one byte for indicating the duration and if, for example, 20 ms is used as an incremental time period or step, the duration of each state may range from 0 to 5,120 ms, in 20 ms steps.

Parsing software stored in the phone's memory sequentially reads the records from the data table 190, setting the illumination devices 180 to the specified states for the specified duration, to create the illumination pattern. The data table 190 may include special control entries, which are recognized by a zero in the duration byte. A VERSION mark is one type of special entry used at the beginning of the table. The VERSION mark includes the pattern 0xff followed by a 2-byte unsigned version number, with an implicit decimal comma 2 digits to the left. A LABEL entry is used to mark the beginning of a LOOP or BOUNCE series of states. The index for the loop is loaded into a label register. A LABEL mark includes the pattern 0x800000 for the state and a zero for the duration. A LOOP entry includes a LOOP mark and a counter. The first time the loop is found, if the label register is not empty (i.e., at 0), the counter is loaded into a register and control is transferred to the line at position index+1. If the label register is empty, the LOOP instruction is ignored. The next time the loop is found, the counter is decremented. If the new value is greater than 0, the loop is repeated. If the value is 0, then control is transferred to the state immediately after the LOOP entry. A LOOP n mark includes the pattern 0xC0 followed by the number of times to repeat (2 bytes unsigned) and a zero for the duration. A BOUNCE entry is similar in function to a LOOP entry, except BOUNCE causes the entries between LABEL and BOUNCE to be executed down and up through each execution of the BOUNCE. The check for the end of the BOUNCE is done when the LABEL entry is reached, and an extra index mark is needed for the BOUNCE entry, so control can be transferred to BOUNCE+1 after the n iterations are done. A BOUNCE n mark consists of the pattern 0x40 followed by the number of times to repeat (2 bytes unsigned) and a zero for the duration. The END mark indicates the end of the sequence. When END is reached, all illumination devices 180 are turned off and execution of the light pattern is finished. The END mark includes the pattern 0x000000 followed by a zero for the duration.

FIG. 8 illustrates an example data table that causes both columns 174, 176 of illumination devices 180 to illuminate upwards and leave a trail of lit illumination devices 180. The records 200 for States 1-6 include three cells for indicating the state of the eight illumination devices 180 and one cell for indicating the duration. The cells indicating the states include numbers expresses in base 16. For example, the first three cells in the second data record 200 include the numbers 0x00, 0x70, and 0x07. In base 16, 0x00 is equal to 0, which in binary is represented in eight bits by 00000000. In base 16, 0x70 is equal to 112, which in binary is represented in eight bits by 11100000. In base 16, 0x07 is equal to 7, which in binary is represented in eight bits by 00000111. The binary equivalent to 0x00, 0x70, and 0x07 put in the bit table format shown in FIG. 7 results in:

| 000 | 000 | 001 | 110 | 000 | 000 | 000 | 111 |
|-----|-----|-----|-----|-----|-----|-----|-----|
| 1   | 2   | 3   | 4   | 5   | 6   | 7   | 8   |

From this table, it can be seen that this data record 200 defines the states of the illumination devices 180 as follows: the first illumination device is at a "0" intensity level, the second illumination device is at a "0" intensity level, the third illumination device is at a "1" intensity level, the fourth illumination device is at a "6" intensity level (i.e., 6 is the equivalent to 110 in binary), the fifth illumination device is at a "0" intensity level, the sixth illumination device is at a "0" intensity level, the seventh illumination device is at a "0" intensity level, and the eight illumination device is at a "7" intensity level (i.e., 7 is the equivalent to 111 in binary). The last cell in the data record 200 defines the duration in binary. The binary number 100 is equal to 4. If the base period is 20 ms, the duration for State 1 turns out to be 80 ms (4×20 ms=80 ms). The parsing software sequentially reads the data records 200 to cause the illumination devices to illuminate in the defined states and durations to create the illumination pattern. It will be appreciated that more or few bits may be used to increase or decrease, respectively, the number of available levels, intensities, or colors.

Light patterns such as, but not limited to, those discussed with respect to FIG. 5 may be compiled with the parsing software or can be run from files. The file format for a light pattern may be as follows: 1) the file name may be the name used in the interface of the phone 100 and may be less than 25 (7-bit ASCII) characters long, 2) the file may end with the extension KWL, 3) the file may be binary, 4) the first and last four bytes may be a CRC code (0xFFFFFFFF-file size), 5) the rest of the file may be an image of the data table (the first three bytes of the table may always contain the version tag (1 byte=0xff) and the version number (unsigned short with an implicit comma 2 digits to the left).

The user may set up the phone 100 to cause different illumination patterns to occur upon different events in a manner to be described in more detail below. Further, files representing new illumination patterns may be downloaded to the phone 100 via any known transport mechanism.

The illumination devices 180 may also illuminate in predetermined patterns that are not user-defined upon certain events. For example, but not by way of limitation, as the phone 100 is plugged into an external power source, the illumination devices 180 may be lit in the "Up and Fall" pattern. Upon disconnection of the phone from the external power source or when the phone 100 is powered on, the illumination devices 180 may be illuminated in the pattern "Solid" for 3 seconds.

With reference to FIG. 9, gaming software or other software run on the phone 100 may cause the illumination devices 180 to illuminate in a pattern or sequence corresponding to activity or situations that occur when the software is run. The software may include data in a format similar to that described above to control illumination of the illumination devices 180 when the software is run. For example, when a player dies in a video game, the illumination devices 180 may be caused to illuminate in the pattern "Solid" and fade out to an off condition. When a player shoots, the illumination devices 180 may be caused to illuminate in an "Upwards" pattern that is synchronized with the firing key on the phone 100. When a player wins a round, the illumination devices 180 may be caused to illuminate in the "Circle" pattern. Further, the life level, power level, or other level of a player or opponent may be shown by the number of illumination devices 180 lit (e.g., a high level may be represented by all illumination devices 180 being lit, a low level may be represented by only the bottom illumination devices 180 being lit).

To synchronize lighting of the illumination devices 180 with the playing of music or other sound files on the phone 100, the parsing program or another program may cause specific illumination devices 180 to illuminate based on measured frequency of sound output from a sound file. For example, a high frequency range may cause the top illumination devices 180 to illuminate, a middle frequency range may cause the upper-intermediate illumination devices 180 to illuminate, a lower frequency range may cause the lower-intermediate illumination devices 180 to illuminate, and a lowest frequency range may cause the bottom illumination devices 180 to illuminate.

In a further embodiment of the phone 100, one column 174, 176 may illuminate upon a local incoming call and the other column 174, 176 may illuminate upon a long-distance incoming call.

When the vertical columns 174, 176 of illumination devices 180 are not being illuminated from an incoming call or other event, they may be used to represent one or more conditions of the phone 100. For example, but not by way of limitation, the illumination devices 180 in the left column 174 may indicate the power level of one or more power sources (e.g., one or more rechargeable batteries, fuel cells) of the phone 100. If none of the illumination devices 180 are lit in the left column 174, the phone 100 may be out of power or almost out of power. If one of the illumination devices 180 are lit in the left column 174, the phone 100 may be at a low power level. If two of the illumination devices 180 are lit in the left column 174, the phone 100 may be at a medium-low power level. If three of the illumination devices 180 are lit in the left column 174, the phone 100 may be at a medium-high power level. If all four of the illumination devices 180 are lit in the left column 174, the phone 100 may be at a high power level.

The illumination devices 180 in the right column 176 may indicate the relative signal receiving strength of the phone 100 in a manner similar to that described above for the power level. If the columns 174, 176 are used to indicate the power-level or signal-strength column 176 of the phone 100, the columns 174, 176 preferably include three or more illumination devices 180. In an alternative embodiment, the left column 174 may indicate signal strength and the right column 176 may indicate power level. In a further embodiment, only one of the columns 174, 176 may exist.

The housing 120 may include some indicia (e.g., symbols for power, signal strength) for indicating which column 174, 176 represents the power level of the phone 100 and which column 174, 176 represents the signal strength of the phone 100.

It should be noted, in one or more embodiments, the illumination devices 180 may perform one or more of the following functions: 1) visually alert a user of an incoming call or an event, 2) visually indicate the power level of the phone 100, and 3) visually indicate the signal strength of the phone 100.

The phone 100 will now be described in use. Upon an incoming communication (e.g., phone call, text message, email, voicemail message), the receiver of the phone 100 receives one or more signals representative of the incoming communication. The electronics or the software process the one or more signals representative of the incoming communication and cause the illumination devices 180 in the columns 174, 176 to illuminate, visually notifying the user of the incoming communication.

With reference to FIG. 10, an embodiment of a light-alert user interface 300 of the phone 100 and method of use will now be described. The user interface 300 may be used to set up and store distinct light-alert patterns for different types of events so that the pattern that the illumination devices 180 illuminate in may visually indicate to the user the type of event that is occurring.

An exemplary Settings menu 310 is shown in the display 160 at the top of FIG. 10. The Settings menu 310 may include a Silence all item, a Keyguard item, a Sounds item, a Display item, and a Voice Services item.

If the Display item is selected, a Display Settings menu 320 may be generated in the display 160. The Display Settings menu 320 may include a FunLights item, a Backlighting item, a My Banner item, a Shortcut Key item, and a Main Menu View item. The term "FunLights" is a coined term that represents a light-alert user interface menu that may be selected.

If the "FunLights" item is selected, a FunLights Settings or light-alert user interface menu 330 may be generated in the display 160. The FunLights Settings menu 330 may include an Incoming Calls item, a Business Calls item, a Personal Calls item, an Incoming Text Message item, a Voice Message item, an Outgoing call or Message item, a Schedular Alerts item, and an Alarm clock item. The items under the FunLights Settings Menu 330 may be any of a number of different types of events (e.g., types of incoming calls, types of incoming communications, types of outgoing communications, types of alarms or alerts) that a distinct illumination pattern may be set up for.

If the Incoming Calls item is selected, an illumination pattern menu 340 may be generated in the display 160. The illumination pattern menu 340 may include a list of different types of illumination patterns that may be generated with the illumination devices 180. As discussed above with respect to FIG. 5, the patterns may include, but are not limited to, a "Solid" pattern, a "Circle" pattern, an "Upwards" pattern, a "Downwards" pattern, an "Opposite" pattern, an "Up and Fall" pattern, and an "Off" item to turn the light-alert feature off. Highlighting any of the pattern options may cause the illumination devices 180 to be lit in that pattern for a period of time. A particular illumination pattern is assigned to Incoming Calls by selecting the particular pattern in the menu 340. Patterns for other events may be assigned to the events in a similar manner.

As discussed above, a problem with a ringer is that the audible ring emitted can be distracting to others and not heard in loud environments. A vibration mechanism in a cell phone, in certain situations, can emit a distracting rumbling noise and is often missed if the mobile handset is located across the room from the user or the phone is not located adjacent the user's body so that it can be sensed. The light-alert mechanism 172 visually indicates a phone event to the user without emitting any noise or vibration, and without audibly distracting others. The light alert may be used in loud environments where the user might not normally hear a ringer or alarm, or situations where the user might not sense a vibration mechanism. The bright, intense LED illumination devices 180, the location of the illumination devices 180 on the housing 120, and the number of illumination devices 180 allow the light alert to be seen across the room and in all environmental lighting conditions.

It will be readily apparent to those skilled in the art that still further changes and modifications in the actual concepts described herein can readily be made without departing from the spirit and scope of the invention as defined by the following claims.

What is claimed is:

1. A wireless communication device, comprising:
light sources configured to alert a user of the device to one or more events or conditions;
electronics configured to illuminate the light sources in a pattern that results from illuminating the light sources according to a sequence of data records,
each data record associating intensity fields with a duration field,
each of the light sources that is illuminated during the pattern being associated with a different one of the intensity fields in each of the data records and each of the intensity fields in each one of the data records being associated with a different one of the light sources that is illuminated during the pattern,
an intensity value entered into each intensity field indicating an intensity at which the associated light source is to be illuminated,
a duration value entered into the duration field indicating a single duration that the electronics associate with each of the light sources that is illuminated during the pattern,
one of the data records in the sequence having different intensity values entered into different intensity fields,
the electronics illuminating the light sources according to each data record by illuminating each light source that is illuminated during the pattern at the intensity value entered into the associated intensity field, and
the electronics associating all of the light sources that are illuminated during the pattern with the single duration entered into the duration field of each data record in that the electronics illuminate the light sources according to each data record for the single duration entered into the duration field of the data record.

2. The device of claim 1, wherein the sequence of data records is one of a plurality of sequences of data records and different sequences are associated with different events or conditions, each of the different sequences resulting in a different pattern.

3. The device of claim 2, wherein the light sources are on a housing in columns and different light sources are associated with different events or conditions, the electronics illuminating only the light sources associated with a particular event or condition when illuminating the light sources according to the sequence of data records associated with the particular event or condition.

4. The device of claim 1, wherein a portion of the intensity values indicate a zero intensity.

5. The device of claim 1, wherein the intensity values in a first one of the data records indicates that a first selection of the light sources are illuminated with the remainder of the light sources are extinguished and the intensity values in a second one of the data records indicates that a second selection of the light sources are illuminated while the remainder of the light sources are extinguished, the first selection of light sources being different from the second selection of the light sources.

6. The device of claim 1, wherein different data records have different durations.

7. The device of claim 1, wherein the electronics are configured to repeatedly illuminate the light sources according to the sequence of data records such that the pattern is continuously repeated.

8. The device of claim 1, wherein the light sources are on a housing in columns, and
illuminating the light sources according to the sequence of data records sequentially illuminates the light sources in a circle pattern.

9. The device of claim 1, wherein the light sources are on a housing in a column having a top and a bottom, and
illuminating the light sources according to the sequence of data records sequentially illuminates the light sources moving from the bottom of the column to the top of the column.

10. The device of claim 1, wherein the light sources are on a housing in a column having a top and a bottom, and
illuminating the light sources according to the sequence of data records sequentially illuminates the light sources moving from the top of the column to the bottom of the column.

11. The device of claim 1, wherein the light sources are on a housing in columns that each has a top and a bottom, and
illuminating the light sources according to the sequence of data records sequentially illuminates the light sources in one of the columns moving from the bottom of the columns to the top of the columns and illuminates the light sources in the other column moving from the top of the column to the bottom of the column.

12. The device of claim 1, wherein the data records are arranged in a table.

13. The device of claim 1, wherein the electronics are configured to receive the pattern from a user of the device.

14. The device of claim 1, wherein the electronics are configured to download the pattern from a source outside of the device.

15. The device of claim 1, wherein the electronics are configured to synchronize the selection of data records with an audio file.

16. The method of claim 1, wherein each of the light sources is visible from outside of the device.

17. A method of operating a wireless communication device, comprising:

accessing data records associated with light sources configured to alert a user of the device to one or more events or conditions,
illuminating the light sources according to a sequence of data records,
the light sources illuminating in a pattern that results from illuminating the light sources according to the sequence of data records,
each data record associating intensity fields with a duration field,
each of the light sources that is illuminated during the pattern being associated with a different one of the intensity fields in each of the data records and each of the intensity fields in each one of the data records being associated with a different one of the light sources that is illuminated during the pattern,
an intensity value entered into each intensity field indicating an intensity at which the associated light source is to be illuminated,
a duration value entered into the duration field indicating a single duration to be associated with each of the light sources that is illuminated during the pattern,
one of the data records in the sequence having different intensity values entered into different intensity fields,
illuminating the light sources according to each data record including illuminating each light source that is illuminated during the pattern at the intensity value entered into the associated intensity field, and
associating all of the light sources that are illuminated during the pattern with the single duration entered into the duration field of each data record in that illuminating the light sources according to each data record is done for the single duration entered into the duration field of the data record.

18. The method of claim 17, wherein the sequence of data records is one of a plurality of sequences of data records and different sequences are associated with different events or conditions, each of the different sequences resulting in a different pattern.

19. The method of claim 17, wherein a portion of the intensity values indicate a zero intensity.

20. The method of claim 17, wherein different data records have different durations.

21. The method of claim 17, wherein the data records are arranged in a table.

22. A program product for a wireless communication device, the program product comprising: computer-executable logic contained on a computer-readable medium and configured for causing the following computer-executed operations to occur:
accessing data records associated with light sources configured to alert a user of the device to one or more events or conditions,
illuminating the light sources according to a sequence of data records,
the light sources illuminating in a pattern that results from illuminating the light sources according to the p2 f data records,
each data record associating intensity fields with a duration field,
each of the light sources that is illuminated during the pattern being associated with a different one of the intensity fields in each of the data records and each of the intensity fields in each one of the data records being associated with a different one of the light sources that is illuminated during the pattern, an intensity value entered into each intensity field indicating an intensity at which the associated light source is to be illuminated, a duration value entered into the duration field indicating a single duration to be associated with each of the light sources that is illuminated during the pattern, one of the data records in the sequence having different intensity values entered into different intensity fields, illuminating the light sources according to each data record including illuminating each light source that is illuminated during the pattern at the intensity value entered into the associated intensity field, and associating all of the light sources that are illuminated during the pattern with the single duration entered into the duration field of each data record in that illuminating the light sources according to each data record is done for the single duration entered into the duration field of the data record.

23. The program product of claim 22, wherein the sequence of data records is one of a plurality of sequences of data records and different sequences are associated with different events or conditions, each of the different sequences resulting in a different pattern.

24. The program product of claim 22, wherein a portion of the intensity values indicate a zero intensity.

25. The program product of claim 22, wherein the light sources are capable of having more than one color and the state information indicates the color of each light source.

26. The program product of claim 22, wherein different data records have different durations.

27. A wireless communication device, comprising:

light sources configured to alert a user of the device to one or more events or conditions;

means for illuminating the light sources according to a sequence of data records, the light sources illuminating in a pattern that results from illuminating the light sources according to the sequence of data records, each data record associating intensity fields with a duration field, each of the light sources that is illuminated during the pattern being associated with a different one of the intensity fields in each of the data records and each of the intensity fields in each one of the data records being associated with a different one of the light sources that is illuminated during the pattern, an intensity value entered into each intensity field indicating an intensity at which the associated light source is to be illuminated, a duration value entered into the duration field indicating a single duration that the means for illuminating the light sources associates with each of the light sources that is illuminated during the pattern, one of the data records in the sequence having different intensity values entered into different intensity fields, the means for illuminating the light sources illuminating the light sources according to each data record by illuminating each light source that is illuminated during the pattern at the intensity value entered into the associated intensity field, and the means for illuminating the light sources associating all of the light sources that are illuminated during the pattern with the single duration entered into the duration field of each data record in that illuminating the light sources according to each data record is done for the single duration entered into the duration field of the data record.

28. The device of claim 1, wherein illuminating the light sources in the particular data record includes concurrently lighting the light sources in the particular data record.

* * * * *